Sept. 4, 1956

R. J. VERNIER 2,761,314

DYNAMOMETER

Filed Dec. 3, 1953

Inventor
Robert J. Vernier

By George Renehan
Attorney

United States Patent Office 2,761,314
Patented Sept. 4, 1956

2,761,314
DYNAMOMETER

Robert J. Vernier, Baltimore, Md., assignor to the United States of America as represented by the Secretary of the Army Application December 3, 1953, Serial No. 396,085

3 Claims. (Cl. 73—134)

(Granted under Title 35, U. S. Code (1952), sec. 266)

The invention described herein may be manufactured and used by or for the Government of the United States of America for governmental purposes without the payment to me of any royalty thereon.

This invention relates to a dynamometer adapted for measuring the brake horsepower of small motors and engines.

The object of this invention is to provide a simple dynamometer for use where elaborate equipment is not justified and which may be used by unskilled personnel for quickly determining the horsepower for small engines and motors, e. g., fractional horsepower electric motors.

Figure 1:
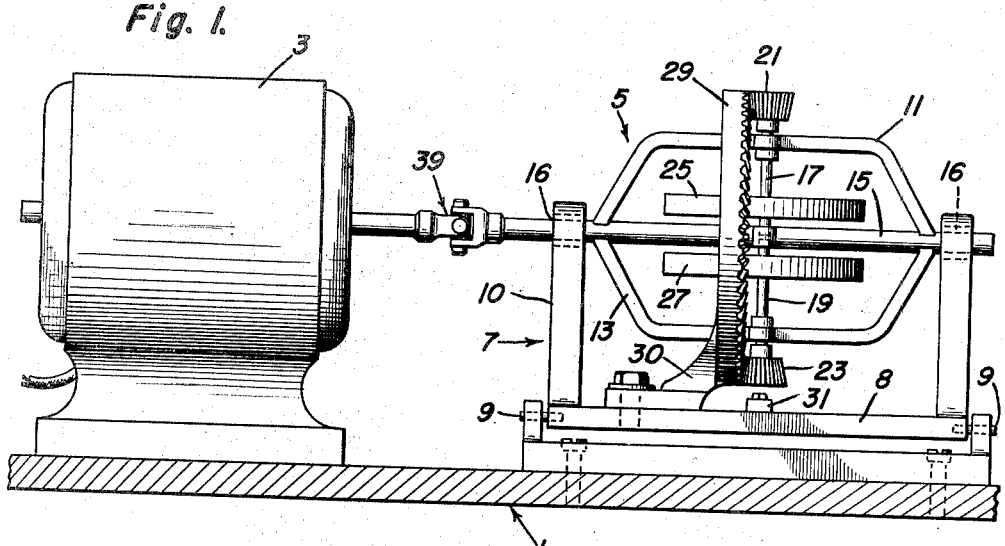
Figure 2:
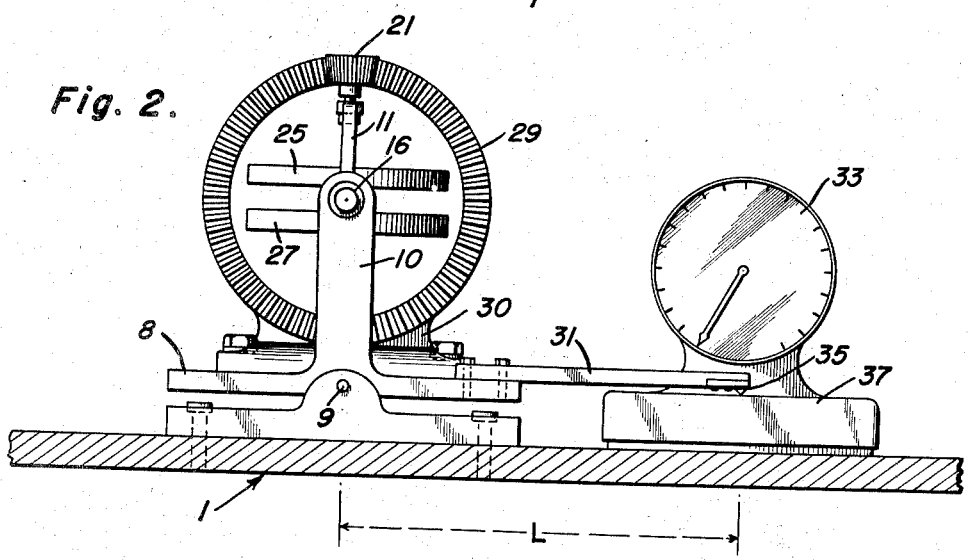

In the drawings, Figure 1 is a side elevation view of my dynamometer and a motor to be tested. Figure 2 is a right end view of the dynamometer.

The drawings are more or less diagrammatic in character. For simplicity, the scale is not shown in Figure 1 and the motor being tested is not shown in Figure 2. The apparatus comprises a base 1 on which is mounted the motor 3 and the dynamometer 5. The dynamometer includes a base upon which is pivotally mounted at 9 a cradle 7, said cradle including a cradle base 8 and uprights 10. A cage, formed by opposed frame members 11, 13 and a main shaft 15, is journalled at 16 in the uprights 10. The cage carries transverse shafts 17 and 19. These shafts are driven by gears 21 and 23 and carry flywheels 25 and 27, respectively. A stationary ring gear 29 is mounted on cradle base 8 by bracket 30. The cradle base 8 also carries a torque arm 31. The torque arm engages a force measuring device which may be an ordinary platform scale 33. The torque arm is shown as provided with a knife edge 35 which engages scale platform 37. Motor 3 is connected to main shaft 15 through universal coupling 39.

When the motor is rotated the gyroscopic forces set up by flywheels 25 and 27 act as a strong braking force on the cage 11, 13, 15. This creates a torque through ring gear 29 which tends to tip cradle 7 about pivots 9. The torque is transmitted through torque arm 31 to scale 33.

The gyroscopic forces set up by a single flywheel tend to cause precession of its axis. It was found that in my device this produced undesirable vibrations. The use of two oppositely rotating flywheels serves to balance these forces and reduce vibration.

The motor to be tested is rotated at any suitable speed, which is measured by a tachometer. The scale 33 is then read, the brake horsepower may then be computed in the usual manner using the formula $$H. P. = 2\pi LN(W-W')/33,000$$

where L is the length of the torque arm as shown in Figure 2 in feet, N is revolutions of the motor per minute and W, W' are the scale readings in pounds with the motor rotating and stationary, respectively.

For simplicity, I have shown and described only the important features of the apparatus. Suitable bearings, lubricating structure, and other mechanical features will of course be provided in use.

While I have described a specific embodiment of my invention, it may obviously be varied in a number of respects. I, therefore, do not wish my invention to be limited except by the scope of the appended claims.

I claim:

1. A dynamometer comprising a base, a cradle pivotally mounted on said base for oscillation about a first axis, a cage journaled on said cradle for rotation about a second axis parallel to said first axis, a transverse shaft journaled in said cage for rotation about a third axis at right angles to said second axis, a drive gear on said transverse shaft, a flywheel on said transverse shaft, a ring gear rigidly mounted on said cradle, said drive gear engaging said ring gear during rotation of said cage, means for coupling said cage to a motor to be tested for rotation thereby, and means for measuring the torque produced on said cradle.

2. A device as defined in claim 1 and further comprising a second transverse shaft mounted in said cage substantially coaxially with said first transverse shaft, a flywheel, substantially identical with said first-mentioned flywheel, mounted on second transverse shaft, a second drive gear on said second transverse shaft and engaging said ring gear at a point 180° removed from first drive gear whereby said second shaft is rotated in the opposite direction from said first shaft.

3. A device as defined in claim 2 wherein said means for measuring the torque comprises a torque arm rigidly secured to said cradle at one end and a force measuring device engaging the other end of said torque arm.

References Cited in the file of this patent

UNITED STATES PATENTS

| 669,568 | Webb | Mar. 12, 1901 |
| 2,028,374 | Anderson | Jan. 21, 1936 |

FOREIGN PATENTS

| 200,852 | Germany | Aug. 1, 1908 |